United States Patent [19]

Fricke

[11] Patent Number: 5,222,895
[45] Date of Patent: Jun. 29, 1993

[54] TACTILE GRAPHIC COMPUTER SCREEN AND INPUT TABLET FOR BLIND PERSONS USING AN ELECTRORHEOLOGICAL FLUID

[76] Inventor: Joerg Fricke, Hegenscheider Str. 6, D-5860 Iserlohn, Fed. Rep. of Germany

[21] Appl. No.: 667,863

[22] Filed: Mar. 12, 1991

[30] Foreign Application Priority Data

Mar. 13, 1990 [DE] Fed. Rep. of Germany ....... 4007945
Apr. 14, 1990 [DE] Fed. Rep. of Germany ....... 4012267

[51] Int. Cl.$^5$ .............................................. G09B 21/00
[52] U.S. Cl. ..................... 434/113; 434/112; 434/114; 434/115; 340/407
[58] Field of Search ......................... 434/112–117; 40/406, 407, 422, 439, 477; 340/771, 783, 787, 815.01, 407, 825.19; 252/71, 572, 75, 74, 73; 358/94

[56] References Cited

U.S. PATENT DOCUMENTS

| | | | |
|---|---|---|---|
| 2,417,850 | 3/1947 | Winslow | 175/320 |
| 2,661,596 | 12/1953 | Winslow | 60/52 |
| 3,047,507 | 7/1962 | Winslow | 252/75 |
| 3,587,613 | 6/1972 | Mark et al. | 137/81.5 |
| 3,987,438 | 10/1976 | Lindenmueller | 340/407 |
| 4,178,586 | 12/1979 | Schonherr | 340/407 |
| 4,191,945 | 3/1980 | Hannen et al. | 340/407 |
| 4,633,121 | 12/1986 | Ogawa et al. | 434/114 |
| 4,664,632 | 5/1987 | Tretinkoff et al. | 434/114 |

FOREIGN PATENT DOCUMENTS

| | | | |
|---|---|---|---|
| 2481802 | 7/1979 | U.S.S.R. | |
| 2212336 | 7/1989 | United Kingdom | 434/119 |

OTHER PUBLICATIONS

*Applications of the Electrorheological Effect in Engineering Practice,* Fluid Mechanics, Soviet Research, vol. 8, No. 4, Jul.-Aug. 1979.
*Electronic aids for blind persons: an interdisciplinary subject,* Prof. L. Kay.

Primary Examiner—Richard J. Apley
Assistant Examiner—Glenn E. Richman
Attorney, Agent, or Firm—Renner, Kenner, Greive, Bobak, Taylor & Weber

[57] ABSTRACT

A tactile screen for blind users is formed by a board with an array of holes filled with an electrorheological fluid and a membrane fixed on the surface of the board. The holes are equipped with electrodes forming electrically controlled valves which connect or disconnect the cavities under the membrane with the fluid on the back of the board. To set the membrane section over a valve to a certain state, the pressure of the fluid must be set to the desired valve and the valve must be opened. Another possibility is to form by electrodes, a bidirectional pump in each hole. The user is getting the information by immediately touching the membrane or by touching pins lifted by the membrane. By successively switching electrical impulses on all rows and columns of electrodes and evaluating the electrical signal capacitively coupled to the body of the user, the coordinates of the users fingertips are determined. In this way the board is used as an input device.

5 Claims, 3 Drawing Sheets

TACTILE GRAPHIC COMPUTER SCREEN AND INPUT TABLET FOR BLIND PERSONS USING AN ELECTRORHEOLOGICAL FLUID

TECHNICAL FIELD

The present invention relates in general to tactile input/output devices which display symbols and graphics received from, sent to electronic control equipment or to a computer. More particularly the present invention relates to an apparatus which can be employed by blind persons to interact with a computer. Specifically, the present invention relates to input/output device employing an electrorheological fluid to operatively interact with a fluid valve for transmitting information to the device that may be tactilly felt by the user.

BACKGROUND OF THE INVENTION

The invention relates to tactile output devices for blind persons displaying symbols and graphics provided by a computer. The invention also relates to input devices for blind computer users.

Known tactile displays employ electromagnetically or piezoelectrically driven pins to provide the information to the tactile perception of the user. An electromagnetic display element is described by Alfred Bottig in his German Pat. No. 1,094,808, issued Dec. 15, 1960. Tactile devices provide up to 80 braille symbols or 144 dots of graphic information (Kay, L. Electronic aids for blind persons; an interdisciplinary subject. In: IEE Proceedings, Vol. 131, Pt.A. No. 7, September 1984, S.559,576). Another approach is to stimulate the skin of the user by limited electrical current (Brümmer. Hans: Untersuchung von elektrotaktilen Schrift- und Bildtasverfaren fur Blinde. By: VDI Verlag, Eüsseldorf, Germany, 1987). Braille printers can be used to display symbolic and graphic information on special paper.

In some cases it would be advantage to provide a whole drawing or a variable portion of a drawing to the user. Examples of this are: reading usual block print books containing text and drawings making use of a scanner or a camera, reading a map using an information system, and creating drawings by means of a computer. With braille printers the user has to produce a copy before deciding if the information is useful and will further have to produce a copy after each modification or zooming of the drawing. Electromagnetic and piezoelectric display elements are expensive, especially if they are bistable to provide a storage of their states. Additionally, these elements can be packed in graphically useful distances of about 0.05 inch only with great effort. Electrotactile methods are not well liked by its users, and driving a large amount of electrodes separately is very expensive as is true with all elements without bistable states.

Electrorheological fluids are fluids that raise their viscosity reversibly if an electrical field is applied. Additionally they adhere to the electrodes and the volume of the fluid increases under the influence of the field. An electrorheological fluid is described by Willis M. Winslow in his U.S. Pat. No. 2,417,850 issued Mar. 25, 1947: U.S. Pat. No. 2,661,596, issued Dec. 8, 1953; and U.S. Pat. No. 3,047,507, issued Jul. 31, 1962. A valve for electrorheological fluids is described by John W. Mark and Howard H. Barney in their U.S. Pat. No. 3,587,613, issued Jun. 28, 1971. A pump using electrorheological fluids is described in the Soviet Pat. App. No. 2,481,802/06.

SUMMARY OF THE INVENTION

It is an object of the invention to provide a tactile screen with very low cost display elements.

Another object is to provide display elements with a relatively small diameter.

Another object is to provide display elements with a storage of their state.

Another object is to provide hydraulically driven and electrically controlled display elements with storage, connected to collecting lines in such a way that each element can be electrically addressed and hydraulically be set to a desired state, consequently reducing the number of outputs in the electronic control equipment to the sum of $m+n$ outputs for driving a m-by-n array of display elements.

Another object is provide electrically driven display elements with storage and a pump in each one, consequently working with constant pressure in the reservoir and saving the need for a pump controlling the pressure in the reservoir.

Another object is to provide a tactile screen for abundant use comprising a membrane driving pins in the holes of a covering board.

Another object is to provide a tactile screen that is used as graphic input device additionally, enabling the user to point, to select and to draw on the screen directly.

Other object and advantageous features of the invention will be apparent in a description of a specific embodiment thereof, given by way of example only, to enable one skilled in the art to readily practice of the invention, and described hereinafter with reference to the accompanying drawing.

In brief, the present invention provides a tactile screen for blind people formed by an electrical insulating board with an array of holes through it and a membrane fixed on the surface of the board. Each hole is closed at the upper side by the adjacent piece of the membrane and is open at the back to a reservoir common to all holes. This reservoir and all holes are filled with an electrorheological fluid. Inside each hole there are electrodes to form an electrically driven valve. These electrode are connected to collecting lines for each row and each column of holes. Accordingly, these valves are addressed by coincidence. Only valves with the same electrical potential at the adjacent row and column lines are opened. The membrane over a hole can be moved by the pressure of the fluid. The cavity under the membrane is used to store a certain amount of fluid representing the state of the display element. Setting an element to a certain state is achieved by bringing the pressure in the reservoir to the desired value and opening the corresponding valve. The pressure of the fluid in the reservoir may be controlled by means of a pump for electrorheological fluids or indirectly making use of an air pump and transmitting the air pressure to the fluid by means of a membrane. Aother possibility is to form a bidirectional pump in each hole by suitably arranged electrodes. The electrodes then form two valves with a cavity between them. Pumping is achieved by applying electrical fields in such a temporal order to the valves and the cavity that the changing of the fluid volume causes a peristaltic moving. For abundant use, the lifetime of the membrane can be extended by covering the membrane with another insulating board with holes corresponding to the holes in the basic board and having pins in each hole fixed to the membrane. In this case the user is touching the pins lifted by the membrane instead of the membrane itself. If the user is selecting the input mode, all valves are closed and electrical impulses are switched successively to all row and column lines. These impulses are weakly coupled to the body of the user, making use of the electrical capacitance between the electrodes in the holes and the fingertip of the user. By contacting the other hand of the user directly to an amplifier input and evaluating the temporal behavior of the signal, the electrodes next to the fingertip and consequently the coordinates of the fingertip can be determined.

PREFERRED EMBODIMENT FOR CARRYING OUT THE INVENTION

Figure 1:
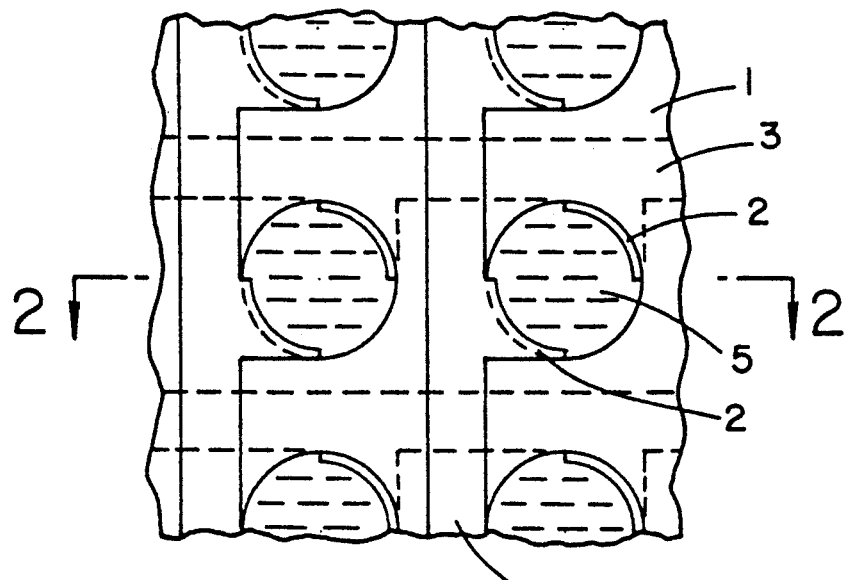
FIG. 1 is a diagram of a section of a board with valves as elements of a tactile screen according to the invention, shown from the back.

Referring to the drawing there is shown in FIG. 1 a section of the nonconductive board 1 with an array of circular holes. Inside each hole there is a pair of electrodes 2 connected to row collection lines 3 or to column collection lines 4, respectively which are connected to the electronic control equipment. The holes are filled with electrorheological fluid 5.

Figure 2:
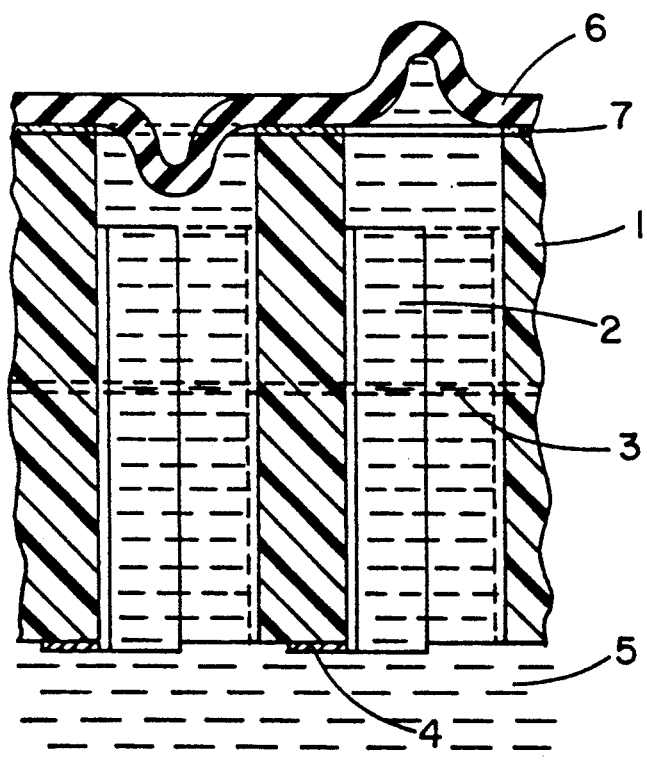
FIG. 2 is a cross-sectional diagram of the section of the screen shown in FIG. 1 taken along lines 2—2.

FIG. 2 shows the same elements and additionally the elastic membrane 6 fixed on the board with a suitable adhesive 7. The display element in the left part of FIG. 2 is in fully reset state, the element in the right half is completely set. The bottom of the reservoir is not shown.

Figure 3:
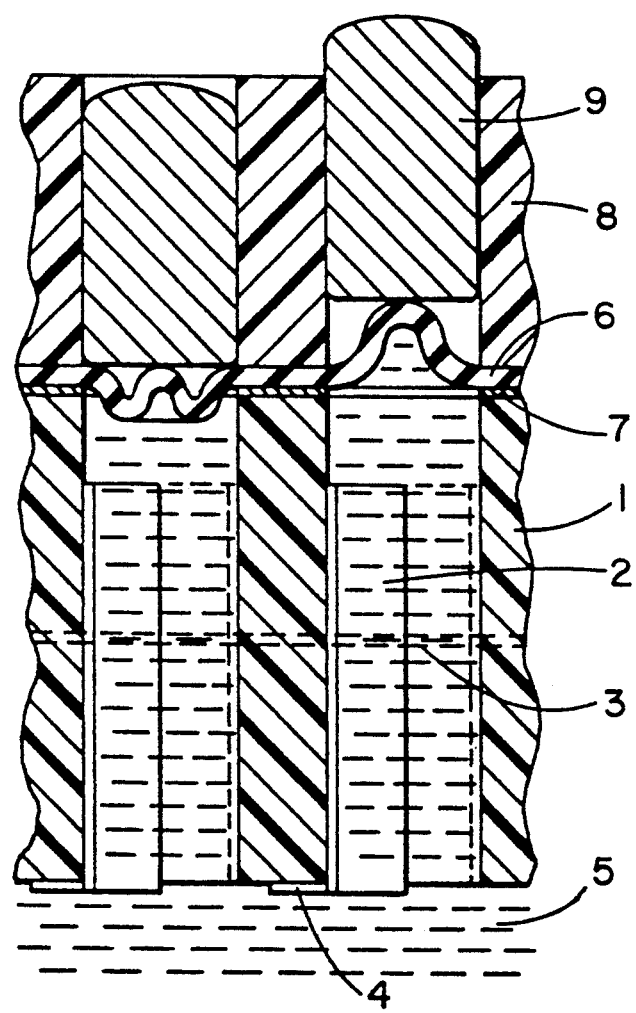
FIG. 3 is a cross-sectional diagram as in FIG. 2, showing tactile elements.

FIG. 3 shows the same elements as in FIG. 2 with the addition of pin 9 used as tactile elements guided in holes of the non-conductive board 8 covering the membrane 6.

Figure 4:
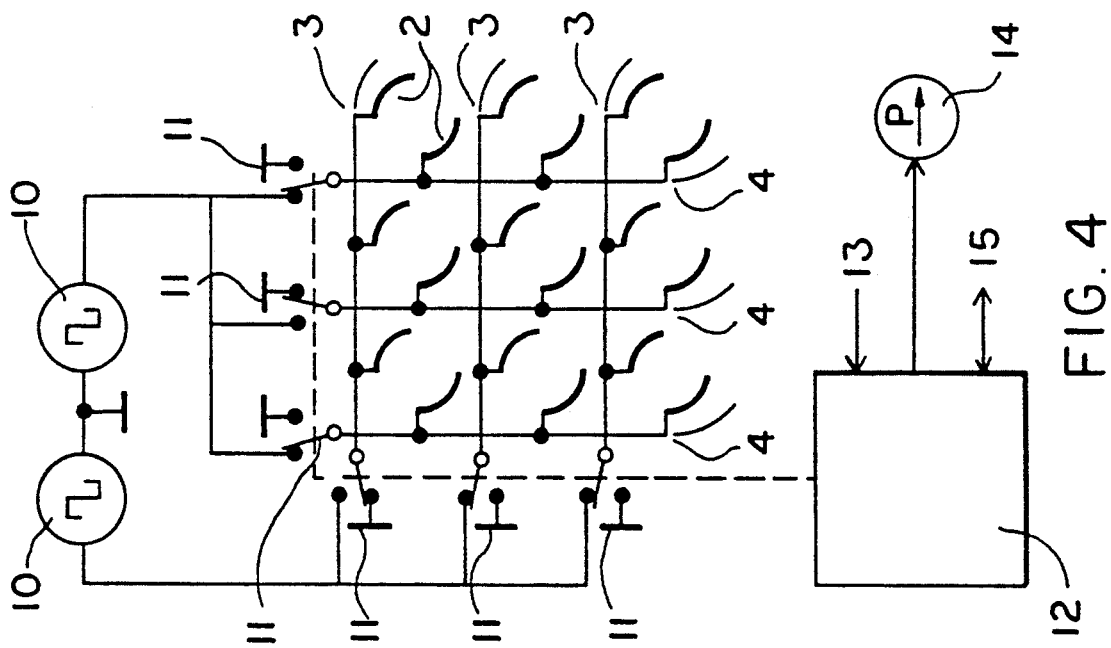
FIG. 4 is a schematic diagram showing the electrical components of the display and its controller.

FIG. 4 shows the electrodes 2 of nine display elements arranged as a three-by-three array. These electrodes are attached to row collection lines 3 or column collection lines 4 and connected to the voltage sources 10 or to other ground potential by electronic switches 11 shown schematically. The switches are controlled by the electronic controller means 12, which also contains an electronic circuit with an input 13. This circuit evaluates the signals on the body of the user in order to determine the coordinates of the fingertip of the user. The electronic controller means 12 also provides an output in order to control the bidirectional fluid pump 14, and it contains an interface 15 to the rest of the system.

Figure 5:
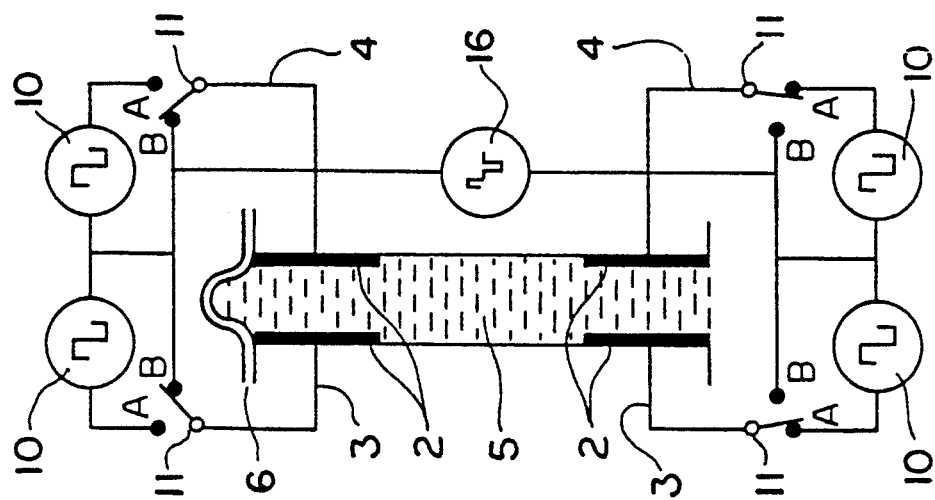
FIG. 5 is a schematic diagram of one display element employing an electronically controlled valve.

FIG. 5 shows the display element which contains two pair of electrodes 2, each one forming a valve connected to the voltage sources 10 by the electronic switches 11 and the collection lines 3 and 4. Another voltage source 16 generates a pulsed electrical field between the upper and lower valve, causing periodical changes of the volume of the fluid 5 in the cavity between the valves. The fluid is forced to flow upward or downware by opening and closing the valves in the appropriate temporal order in relation to the impulses of the source 16.

To obtain a distance of 0.05 inch between the centers of neighboring display elements, the diameter of the holes are about 0.03 inch, providing a minimum distance between electrodes of the same valve of about 0.02 inch, enabling a maximum voltage in the range of 2000 V. The thickness of the board and consequently the length of the valves may be varied in order to adapt the efficiency of the valves to the characteristics of the fluid in use. In order to get long valves some identical board may be glued together to form a stack.

As shown, the row collection lines 3 are located inside the board 1. Column connection lines 4 are attached to the back of the board 1 and there is a distance between the surface of the board 1 and the upper edges of the electrodes 2. The purpose of this design is to protect the user from high voltage in case of a defective membrane 6.

The board 1 could be made out of fiberglass cloth impregnated with epoxy resin. The material of the electrodes 2 and the collecting lines 3 and 4 may be copper, possibly coated with a conductive noncorrosive material. In this case many steps of the fabrication of the board 1 and the conductive parts 2,3, and 4 are the same as for production of usual printed circuit boards. This fact reduces the manufacturing costs by using established technologies. The membrane 6 may be formed from rubber, and glued on the board 1 making use of a cyanoacrylate adhesive 7. Other materials are suitable as far as they are chemically resistant against electrorheological fluids. The electrodes 2 could be made out of an adfhesive filled with conductive particles. If the holes in the board 1 are not drilled, but instead the board is originally produced with through apertures, then the holes may have a rectangular profile to optimize the efficiency of the electrodes.

To reduce the pressure of the fluid 5 required for lifting the membrane 6 the membrane may pre-formed. To reduce the force on the board 1 effected by the pressure of the fluid 5 the back of the board may be glued to the bottom of the reservoir at some points leaving open channels for the fluid 5.

Not shown are the details of the electronic control equipment of, the circuit for determining the place of the users fingertip and the pump for controlling the pressure of the fluid in the reservoir because the construction of these devices will be apparent to those skilled inn the art.

It will be noted, that the described tactile screen may be fabricated from standard materials, as the step of fabrication are simple. During fabrication, only exiting machines such a computer controlled drilling machines and glue dispensers are employed. Further a minimum number of parts are used and the diameter of the display elements is small enough to enable an element distance of 0.05 inches. The apparatus will have a long product life as the construction is reliable by means of using no mechanically moving parts except of fluid and elastic material.

In operation, pressure is applied to the electrorheological fluid by means of the fluid pump thereby lifting the tactile dots on the membrane. The electronic control equipment will then send a potential across the electrodes within the holes corresponding to those tactile dots that are to remain standing. This current increases the volume, as well as the viscosity of the electrorheological fluid. The increased viscosity then prohibits the fluid from flowing back through the apertures. The pressure is then removed, or a vacuum created in the case of a bi-directional pump. The fluid is those apertures having no potential across the corresponding electrodes, will flow back out of the hole thereby allowing the corresponding tactile dots to fall. The information can then be tactilly retrieved by the blind user.

If the user is selecting the input mode, all valves are closed and electrical impulses are switched successively to all row and column lines. These impulses are weakly coupled to the body of the user, making use of the electrical capacitance between the electrodes in the holes and the fingertip of the user. By contacting the other hand of the user directly to an amplifier input and evaluating the temporal behavior of the signal, the electrodes next to the fingertip and consequently the coordinates of the fingertip can be determined.

While an embodiment of the invention has been shown and described, further embodiments or combinations of those described herein will be apparent to those skilled in the art without departing from the spirit of the invention.

I claim:

1. A tactile graphic computer screen for blind persons, comprising tactile display elements driven hydraulically by an electrorheological fluid, in which the electrorheological fluid is controlled by an electronic controller means, said tactile display elements are comprising holes in a nonconductive board equipped with electrodes forming electrically controlled valves and said electrodes are connected to row collection lines or column collection lines respectively, said electronic controller means is able to switch electrical impulses successively on all said row and column collection linese without affecting the states of the said display elements and wherein an electronic circuit is determining the coordinates of the users fingertip by evaluating the signal on the body of the user caused by said impulses.

2. The screen of claim 1, wherein said display elements are using a membrane as the tactile element, driven by sid electrorheological fluid.

3. The screen of claim 2, wherein said membrane is covered by a board and is driving pins as tactile elements, guided in holes of the covering board.

4. The screen of claim 1, wherein each said display element is comprising a bidirectional pump for electrorheological fluids, consisting of a hole equipped with electrodes, forming three sequential sections and enabling a peristaltic movement of the said electrorheological fluid, and wherein said electrodes are connected to row collection lines and column collection lines.

5. The screen of claim 4, wherein the electronic controller means is able to switch electrical impulses successively on said row and column collection lines without affecting the states of the said display elements and wherein an electronic circuit is determining the coordinates of the users fingertip by evaluating the signal on the body of the user caused by said impulses.

* * * * *

UNITED STATES PATENT AND TRADEMARK OFFICE
CERTIFICATE OF CORRECTION

PATENT NO.　：　5,222,895
DATED　：　June 29, 1993
INVENTOR(S)　：　Joerg Fricke

It is certified that error appears in the above-identified patent and that said Letters Patent is hereby corrected as shown below:

Column 1, line 36　"Eusseldorf" should read "Düsseldorf".

Column 2, line 46　"electrode" should read "electrodes".

Column 2, line 60　"Aother" should read "Another".

Column 4, line 15　"connection" should read "collection".

Column 4, line 34　"adfhesive" should read "adhesive".

Column 4, line 50　"inn" should read "in".

Column 4, line 53　"exiting" should read "existing".

Column 4, line 54　"a" should read "as".

Column 5, line 4　"is" should read "in".

Column 6, line 13　"sid" should read "said".

Signed and Sealed this

Thirteenth Day of August, 1996

Attest:

BRUCE LEHMAN

*Attesting Officer*　　*Commissioner of Patents and Trademarks*